US012625015B2

(12) United States Patent
Da Cunha et al.

(10) Patent No.: US 12,625,015 B2
(45) Date of Patent: May 12, 2026

(54) TEMPERATURE SENSING DEVICE FOR AIRCRAFT WHEEL BRAKE

(71) Applicants: AIRBUS OPERATIONS LIMITED, Bristol (GB); Airbus Operations (SAS), Toulouse (FR)

(72) Inventors: Mauricio Pereira Da Cunha, Orono, ME (US); Robert J. Lad, Orono, ME (US); Ian White, Bristol (GB); Kurt Bruggemann, Bristol (GB); Richard Downing, Bristol (GB); Maud Consola, Bristol (GB)

(73) Assignees: AIRBUS OPERATIONS LIMITED, Bristol (GB); AIRBUS OPERATIONS (SAS), Toulouse (FR)

( * ) Notice: Subject to any disclaimer, the term of this patent is extended or adjusted under 35 U.S.C. 154(b) by 525 days.

(21) Appl. No.: 18/071,506

(22) Filed: Nov. 29, 2022

(65) Prior Publication Data
US 2023/0168134 A1 Jun. 1, 2023

Related U.S. Application Data

(60) Provisional application No. 63/284,510, filed on Nov. 30, 2021.

(51) Int. Cl.
*G01K 11/26* (2006.01)
*F16D 66/00* (2006.01)
(Continued)

(52) U.S. Cl.
CPC ............ *G01K 11/265* (2013.01); *F16D 66/00* (2013.01); *G01K 1/02* (2013.01); *G01K 1/024* (2013.01);
(Continued)

(58) Field of Classification Search
CPC ........ G01K 11/265; G01K 1/02; G01K 1/024; G01K 1/08; F16D 66/00; F16D 2066/001
See application file for complete search history.

(56) References Cited

U.S. PATENT DOCUMENTS

| | | | |
|---|---|---|---|
| 3,788,143 A | 1/1974 | Gabriel | |
| 4,241,603 A * | 12/1980 | Han | G01K 1/143 |
| | | | 374/E1.019 |

(Continued)

FOREIGN PATENT DOCUMENTS

| | | |
|---|---|---|
| CN | 101625274 | 1/2010 |
| CN | 204760097 U | 11/2015 |

(Continued)

OTHER PUBLICATIONS

Zhgoon et al. "High Temperature SAW Resonator Sensors: Electrode Design Specifics", retrieved from the Internet on Mar. 8, 2023 <https://hal.univ-lorraine.fr/hal-01868419/document>, pp. 1-8, Dec. 31, 2017.
(Continued)

*Primary Examiner* — Laura Martin
*Assistant Examiner* — Philip L Cotey
(74) *Attorney, Agent, or Firm* — Nixon & Vanderhye, PC

(57) ABSTRACT
A temperature sensing device to sense aircraft wheel brake temperature is disclosed including a sensing device substrate; and one or more package layers attached to the sensing device substrate, wherein: the sensing device substrate carries one or more electronic components for sensing temperature. Also disclosed is a wireless relay device to wirelessly transmit an interrogation signal to a temperature sensing device and wirelessly receive an output signal from the temperature sensing device, the temperature sensing device to sense aircraft wheel brake temperature, the wireless relay device comprising: a relay substrate; and one or more package layers attached to the relay substrate, wherein:
(Continued)

100

108    106

104    102 the relay substrate carries one or more electronic components of the wireless relay device. Also disclosed is a method of manufacturing a temperature sensing device to sense aircraft wheel brake temperature.

10 Claims, 8 Drawing Sheets

(51) Int. Cl.
  G01K 1/02 (2021.01)
  G01K 1/024 (2021.01)
  G01K 1/08 (2021.01)
(52) U.S. Cl.
  CPC .......... G01K 1/08 (2013.01); *F16D 2066/001*
  (2013.01)

(56) References Cited

U.S. PATENT DOCUMENTS

| | | | | |
|---|---|---|---|---|
| 4,249,642 | A * | 2/1981 | Anderson | F16D 55/40 |
| | | | | 188/218 XL |
| 4,569,600 | A * | 2/1986 | Preniczny | G01J 5/0821 |
| | | | | 188/1.11 R |
| 4,658,936 | A * | 4/1987 | Moseley | F16D 66/02 |
| | | | | 188/1.11 R |
| 5,172,960 | A | 12/1992 | Chareire | |
| 5,345,134 | A * | 9/1994 | Greer | H03H 3/08 |
| | | | | 310/313 D |
| 5,392,716 | A | 2/1995 | Orschek et al. | |
| 5,446,452 | A * | 8/1995 | Litton | F16C 19/525 |
| | | | | 374/E1.004 |
| 5,651,430 | A * | 7/1997 | Rancourt | F16D 66/025 |
| | | | | 188/170 |
| 5,705,774 | A * | 1/1998 | Beauchamp | H01B 7/295 |
| | | | | 174/121 R |
| 5,834,117 | A * | 11/1998 | Onishi | H01B 7/292 |
| | | | | 428/389 |
| 5,862,890 | A | 1/1999 | Long et al. | |
| 5,909,171 | A * | 6/1999 | Kyrtsos | F16D 66/00 |
| | | | | 188/1.11 R |
| 6,431,824 | B2 | 8/2002 | Schotsch et al. | |
| 6,592,253 | B2 | 7/2003 | Nyffenegger et al. | |
| 6,696,937 | B1 * | 2/2004 | Kiefer | B60T 8/885 |
| | | | | 340/453 |
| 6,988,026 | B2 * | 1/2006 | Breed | B60R 21/20 |
| | | | | 701/33.9 |
| 7,313,467 | B2 * | 12/2007 | Breed | B60R 21/01534 |
| | | | | 701/32.7 |
| 7,726,184 | B2 * | 6/2010 | Cook | G01L 9/0025 |
| | | | | 73/146.5 |
| 8,087,824 | B2 * | 1/2012 | Bingham | G01K 1/14 |
| | | | | 374/208 |
| 8,858,074 | B2 | 10/2014 | Greenberg et al. | |
| 9,267,561 | B2 * | 2/2016 | Conway | F16D 66/00 |
| 9,415,757 | B2 * | 8/2016 | Martinotto | F16D 65/092 |
| 9,712,894 | B2 * | 7/2017 | Lee | H01Q 1/2225 |
| 9,796,364 | B2 * | 10/2017 | King | G01P 3/487 |
| 9,869,337 | B2 | 1/2018 | Drexler | |
| 10,135,624 | B2 * | 11/2018 | Bill | H04W 12/08 |
| 10,249,410 | B1 * | 4/2019 | Lanoe | H01B 11/06 |
| 10,564,050 | B2 * | 2/2020 | Bruggemann | G01K 11/24 |
| 10,591,395 | B1 | 3/2020 | Jamison et al. | |
| 11,204,285 | B2 * | 12/2021 | Bruggemann | G01K 13/08 |
| 2002/0062904 | A1 * | 5/2002 | Jeong | H01L 23/10 |
| | | | | 156/330 |
| 2002/0078757 | A1 * | 6/2002 | Hines | G01L 19/0092 |
| | | | | 73/702 |
| 2002/0148690 | A1 * | 10/2002 | Wirth | F16D 66/00 |
| | | | | 374/E1.004 |
| 2002/0169231 | A1 * | 11/2002 | Okayama | F16D 69/026 |
| | | | | 523/156 |

| | | | | |
|---|---|---|---|---|
| 2003/0010582 | A1 * | 1/2003 | Denton | F16D 65/0974 |
| | | | | 188/73.38 |
| 2003/0067960 | A1 | 4/2003 | Nyffenegger et al. | |
| 2004/0011596 | A1 * | 1/2004 | Miller | G06Q 40/12 |
| | | | | 303/191 |
| 2004/0164140 | A1 * | 8/2004 | Voeller | G07C 5/008 |
| | | | | 235/375 |
| 2004/0196888 | A1 | 10/2004 | Musbach et al. | |
| 2004/0207059 | A1 * | 10/2004 | Hong | H01L 23/055 |
| | | | | 257/E23.126 |
| 2004/0217670 | A1 * | 11/2004 | Ueda | H03H 9/6483 |
| | | | | 310/313 R |
| 2005/0056098 | A1 * | 3/2005 | Solie | G01L 19/0092 |
| | | | | 73/702 |
| 2005/0088045 | A1 * | 4/2005 | Fondriest | B64C 25/36 |
| | | | | 307/147 |
| 2005/0151599 | A1 * | 7/2005 | Ido | H05K 1/0243 |
| | | | | 333/133 |
| 2006/0025897 | A1 * | 2/2006 | Shostak | G06K 19/0717 |
| | | | | 701/1 |
| 2006/0152074 | A1 * | 7/2006 | Chico | B60T 17/221 |
| | | | | 303/191 |
| 2006/0180371 | A1 * | 8/2006 | Breed | G07C 5/008 |
| | | | | 180/197 |
| 2006/0226698 | A1 * | 10/2006 | Riebe | B60T 8/1703 |
| | | | | 188/162 |
| 2006/0238078 | A1 * | 10/2006 | Liu | G01C 19/5698 |
| | | | | 310/338 |
| 2007/0139165 | A1 * | 6/2007 | Liu | G01N 29/022 |
| | | | | 340/572.5 |
| 2007/0177866 | A1 * | 8/2007 | Fujimoto | G03B 29/00 |
| | | | | 396/376 |
| 2007/0188054 | A1 * | 8/2007 | Hasken | G01L 3/10 |
| | | | | 374/E11.012 |
| 2008/0092641 | A1 * | 4/2008 | Cahill | B60T 8/52 |
| | | | | 73/121 |
| 2008/0265711 | A1 * | 10/2008 | Kumar | G01L 9/0025 |
| | | | | 29/25.35 |
| 2008/0278288 | A1 * | 11/2008 | O'Brien | B60C 23/007 |
| | | | | 340/10.1 |
| 2009/0125286 | A1 * | 5/2009 | Waltz | F16D 65/847 |
| | | | | 703/5 |
| 2009/0165546 | A1 * | 7/2009 | Cook | B60C 23/0496 |
| | | | | 73/146.5 |
| 2009/0213899 | A1 * | 8/2009 | Bingham | G01K 1/14 |
| | | | | 374/E1.018 |
| 2009/0243895 | A1 * | 10/2009 | Mitchell | H01Q 1/007 |
| | | | | 340/971 |
| 2010/0117859 | A1 * | 5/2010 | Mitchell | G01K 1/024 |
| | | | | 340/870.16 |
| 2010/0198472 | A1 * | 8/2010 | Kure | B60T 5/00 |
| | | | | 701/70 |
| 2010/0207754 | A1 * | 8/2010 | Shostak | B60C 23/0433 |
| | | | | 340/572.1 |
| 2010/0250082 | A1 * | 9/2010 | King | G01P 3/487 |
| | | | | 188/18 A |
| 2011/0144879 | A1 * | 6/2011 | Miller | G06Q 40/12 |
| | | | | 701/70 |
| 2011/0241866 | A1 | 10/2011 | Todd et al. | |
| 2011/0276223 | A1 * | 11/2011 | Gowan | G01L 5/28 |
| | | | | 701/33.4 |
| 2011/0280279 | A1 * | 11/2011 | Gregory | G01K 7/343 |
| | | | | 374/152 |
| 2012/0007607 | A1 * | 1/2012 | Lowe | G01M 5/0033 |
| | | | | 324/639 |
| 2012/0018524 | A1 | 1/2012 | Loi et al. | |
| 2012/0296567 | A1 * | 11/2012 | Breed | E05F 15/77 |
| | | | | 701/468 |
| 2012/0318557 | A1 * | 12/2012 | Iwasaki | C08K 5/0025 |
| | | | | 524/80 |
| 2012/0326560 | A1 * | 12/2012 | Yun | H03H 9/02614 |
| | | | | 977/891 |
| 2013/0033381 | A1 * | 2/2013 | Breed | G08B 13/2417 |
| | | | | 340/568.1 |
| 2013/0131891 | A1 * | 5/2013 | Gowan | G01P 3/443 |
| | | | | 701/1 |

(56) References Cited

U.S. PATENT DOCUMENTS

| | | | |
|---|---|---|---|
| 2013/0161058 A1* | 6/2013 | Camp, II | H01B 7/295 |
| | | | 174/102 R |
| 2013/0230075 A1* | 9/2013 | Selles | F16D 66/02 |
| | | | 374/141 |
| 2014/0016670 A1 | 1/2014 | Greenberg et al. | |
| 2014/0018978 A1* | 1/2014 | Cahill | B60T 8/1703 |
| | | | 701/3 |
| 2014/0060168 A1* | 3/2014 | Frank | G01L 7/166 |
| | | | 73/146.2 |
| 2014/0103465 A1* | 4/2014 | Johnson | H03H 9/02992 |
| | | | 438/51 |
| 2014/0198824 A1* | 7/2014 | Nagl | G01K 1/20 |
| | | | 374/163 |
| 2014/0311833 A1* | 10/2014 | Martinotto | F16D 65/092 |
| | | | 29/25.35 |
| 2015/0013461 A1* | 1/2015 | Pollard | G01H 11/08 |
| | | | 73/579 |
| 2015/0077630 A1* | 3/2015 | Miller | F16M 11/26 |
| | | | 348/376 |
| 2015/0112515 A1* | 4/2015 | Conway | F16D 66/00 |
| | | | 701/3 |
| 2015/0280686 A1* | 10/2015 | Robinson | G01K 7/22 |
| | | | 374/117 |
| 2016/0090173 A1* | 3/2016 | Zabulon | G01P 3/44 |
| | | | 244/103 R |
| 2016/0169261 A1* | 6/2016 | Peters | F01N 13/1805 |
| | | | 411/383 |
| 2016/0236019 A1* | 8/2016 | Fyfe | B32B 27/065 |
| 2017/0138423 A1* | 5/2017 | Kirkpatrick | F16D 65/12 |
| 2017/0259942 A1* | 9/2017 | Ziarno | G07C 5/008 |
| 2017/0307036 A1* | 10/2017 | Nuesser | F16D 66/021 |
| 2017/0363482 A1* | 12/2017 | Bruggemann | G01K 13/08 |
| 2019/0057887 A1* | 2/2019 | Ballandras | G01D 5/48 |
| 2019/0283728 A1* | 9/2019 | Jimenez | G01R 31/52 |
| 2020/0041480 A1* | 2/2020 | Worden | G01N 33/26 |
| 2020/0158580 A1* | 5/2020 | Bruggemann | G01K 11/24 |
| 2020/0339083 A1* | 10/2020 | Bill | B60T 13/662 |
| 2021/0095711 A1* | 4/2021 | Pinney | F16B 43/001 |
| 2021/0098153 A1* | 4/2021 | Quadir | H01B 7/292 |
| 2021/0237907 A1* | 8/2021 | Franzini | B64D 43/00 |
| 2022/0046337 A1* | 2/2022 | Hwang | H04Q 9/00 |
| 2023/0167867 A1 | 6/2023 | Da Cunha et al. | |
| 2023/0168132 A1 | 6/2023 | Da Cunha et al. | |
| 2023/0168133 A1 | 6/2023 | Da Cunha et al. | |
| 2023/0168134 A1 | 6/2023 | Da Cunha et al. | |
| 2023/0287951 A1* | 9/2023 | Muniraju | F16D 66/021 |
| 2024/0233982 A1* | 7/2024 | Nomura | H01F 5/06 |

FOREIGN PATENT DOCUMENTS

| | | |
|---|---|---|
| CN | 205122774 | 3/2016 |
| CN | 106 338 347 A1 | 1/2017 |
| CN | 206114142 | 4/2017 |
| CN | 107 271 028 A | 10/2017 |
| CN | 208477997 U | 2/2019 |
| CN | 208655287 U | 3/2019 |
| CN | 109708774 | 5/2019 |
| CN | 110581106 A | 12/2019 |
| CN | 210039711 U | 2/2020 |
| CN | 111122185 A | 5/2020 |
| CN | 112179518 | 1/2021 |
| CN | 214 175 761 U | 9/2021 |
| CN | 214705527 U | 11/2021 |
| CN | 114061786 | 2/2022 |
| DE | 4 006 885 | 10/1990 |
| DE | 102 15 834 | 11/2003 |
| EP | 1 148 266 | 10/2001 |
| EP | 2 642 149 | 9/2013 |
| EP | 2 777 998 | 9/2014 |
| EP | 2788990 A1 | 10/2014 |
| EP | 2 933 619 | 10/2015 |
| EP | 2 980 550 | 2/2016 |
| EP | 3 255 399 | 12/2017 |
| EP | 3 255 399 A2 | 12/2017 |
| EP | 3 530 532 | 8/2019 |
| EP | 3 770 065 A1 | 1/2021 |
| EP | 3 789 744 A1 | 3/2021 |
| GB | 2 250 364 | 6/1992 |
| JP | HO5-667 | 1/1993 |
| JP | H09240468 | 9/1997 |
| JP | 2010064816 | 3/2010 |
| KR | 20150094861 A | 8/2015 |
| KR | 10-2019-0025126 | 3/2019 |
| WO | 2005/097524 | 10/2005 |
| WO | 2007/005020 | 1/2007 |
| WO | 2007/061831 | 5/2007 |
| WO | 2013/086013 A1 | 6/2013 |
| WO | 2018/030942 A1 | 2/2018 |

OTHER PUBLICATIONS

Canabal et al. "Multi-sensor wireless interrogation of SAW resonators at high temperatures", IEEE, International Ultrasonics Symposium Proceedings, pp. 265-268, Oct. 11, 2010.

Extended European Search Report for Application No. EP 22210154.5, 16 pages, dated Mar. 17, 2023.

Extended European Search Report for Application No. EP 22210158.6, 10 pages, dated Mar. 20, 2023.

Extended European Search Report for Application No. EP 22210129.7, 12 pages, dated Apr. 4, 2023.

Extended European Search Report for Application No. EP 22210451.5, 17 pages, dated Apr. 4, 2023.

Extended European Search Report for Application No. EP 22210145.3, 9 pages, dated May 4, 2023.

Extended European Search Report for Application No. EP 22210149.5, 16 pages, dated Apr. 18, 2023.

Extended European Search Report for Application No. EP 22210152.9, 8 pages, dated Apr. 25, 2023.

Behanan et al., "Thin Films and Techniques for SAW Sensor Operation above 1000° C.", 2013 IEEE International Ultrasonics Symposium (IUS), <https://doi.org/10.1109/ULTSYM.2013.0260>, pp. 1013-1016, Jul. 21-25, 2013.

Henriksen T. "Zago—Specialised in ceramic fasteners", available <https://www fastenerandfixing.com/application-technology/specialisedin-ceramicfasteners>, four pages, Jan. 30, 2019.

ND Industries Inc.—VIBRA-TITE, "Hot-Lock Extreme High Temperature Threadlocker", Vibra-tite.com, [online], available from: <https://www.vibratite.com/threadlockers/high-strength-threadlockers/hot-lock-extremehigh-temperature-threadlocker/>, six pages, dated Apr. 28, 2022.

Pohl A., "A Review of Wireless SAW Sensors", IEEE transactions on ultrasonics, ferroelectrics, and frequency control, vol. 47, No. 2, pp. 317-332, Mar. 2000.

Zhou et al. "Novel Multilayer SAW Temperature Sensor for Ultra-High Temperature Environments", Micromachines, vol. 12 No. 6, 643, eight pages, May 31, 2021.

Office Action for U.S. Appl. No. 18/071,047, Six pages, dated Apr. 28, 2025.

Office Action for U.S. Appl. No. 18/071,529, 12 pages, dated May 7, 2025.

Notice of Allowability for U.S. Appl. No. 16/773,254, eight pages, dated Aug. 18, 2021.

Office Action for U.S. Appl. No. 18/071,437, 10 pages, dated Nov. 28, 2025.

Office Action for U.S. Appl. No. 18/071,464, 11 pages, dated Nov. 24, 2025.

* cited by examiner

800

802

Provide a sensing device substrate carrying one or more electronic components for sensing temperature

804

Attach one or more package layers to the sensing device substrate

TEMPERATURE SENSING DEVICE FOR AIRCRAFT WHEEL BRAKE

CROSS RELATED APPLICATION

This application claims priority to U.S. Provisional Patent Application Ser. No. 63/284,510, filed Nov. 30, 2021, the content of which is incorporated by reference in its entirety.

TECHNICAL FIELD

The present invention relates to sensing aircraft wheel brake temperature. More specifically, the present invention relates to a temperature sensing device.

BACKGROUND

When aircraft wheel brakes are applied to reduce the speed of an aircraft, the temperature of the aircraft wheel brakes rises. It can be advantageous to monitor the temperature of the aircraft wheel brakes to, for example, ensure that the brakes do not overheat. For example, temperature sensors such as thermocouples can be used to sense temperature.

SUMMARY

A first aspect of the present invention provides a temperature sensing device to sense aircraft wheel brake temperature, the temperature sensing device comprising: a sensing device substrate; and one or more package layers attached to the sensing device substrate, wherein: the sensing device substrate carries one or more electronic components for sensing temperature.

Optionally, the electronic components comprise: a surface acoustic wave, SAW, sensor element mounted to the sensing device substrate; and a sensor antenna, electrically coupled to the SAW sensor element, provided on the sensing device substrate.

Optionally, the one or more package layers comprise a first package layer overlaid on a first surface of the sensing device substrate to cover the sensor antenna and the SAW sensor element.

Optionally, the one or more package layers comprise a second package layer overlaid on the first package layer such that the first package layer is between the sensing device substrate and the second package layer.

Optionally, the one or more package layers comprise a third package layer overlaid on a second surface of the sensing device substrate, the second surface on the opposite side of the sensing device substrate to the first surface.

Optionally, the first package layer comprises one or more slots to accommodate the electronic components carried by the sensing device substrate.

Optionally, the sensing device substrate and the one or more package layers are hermetically sealed together.

Optionally, the sensing device substrate and/or the one or more package layers comprise a ceramic material.

According to a second aspect of the present invention, there is provided a method of manufacturing a temperature sensing device to sense aircraft wheel brake temperature, the method comprising: providing a sensing device substrate carrying one or more electronic components for sensing temperature; and attaching one or more package layers to the sensing device substrate.

Optionally, in the method according to the second aspect, providing the sensing device substrate comprises providing:

a surface acoustic wave, SAW, sensor element mounted to the sensing device substrate; and a sensor antenna, electrically coupled to the SAW sensor element, on the sensing device substrate.

Optionally, in the method according to the second aspect, attaching one or more package layers comprises: overlaying a first package layer on a first surface of the sensing device substrate to cover the sensor antenna and the SAW sensor element.

Optionally, in the method according to the second aspect, attaching one or more package layers comprises: overlaying a second package layer on the first package layer such that the first package layer is between the sensing device substrate and the second package layer.

Optionally, in the method according to the second aspect, attaching one or more package layers comprises: overlaying a third package layer on a second surface of the sensing device substrate, the second surface on the opposite side of the sensing device substrate to the first surface.

Optionally, in the method according to the second aspect, attaching one or package layers comprises: hermetically sealing the sensing device substrate and one or more package layers together.

According to a third aspect of the present invention, there is provided a wireless relay device to wirelessly transmit an interrogation signal to a temperature sensing device and wirelessly receive an output signal from the temperature sensing device, the temperature sensing device to sense aircraft wheel brake temperature, the wireless relay device comprising: a relay substrate; and one or more ceramic package layers attached to the relay substrate, wherein: the relay substrate carries one or more electronic components of the wireless relay device.

BRIEF DESCRIPTION OF THE DRAWINGS

Embodiments of the invention will now be described, by way of example only, with reference to the accompanying drawings, in which.

DETAILED DESCRIPTION

The following disclosure relates to a temperature sensing device for sensing aircraft wheel brake temperature.

Figure 1:
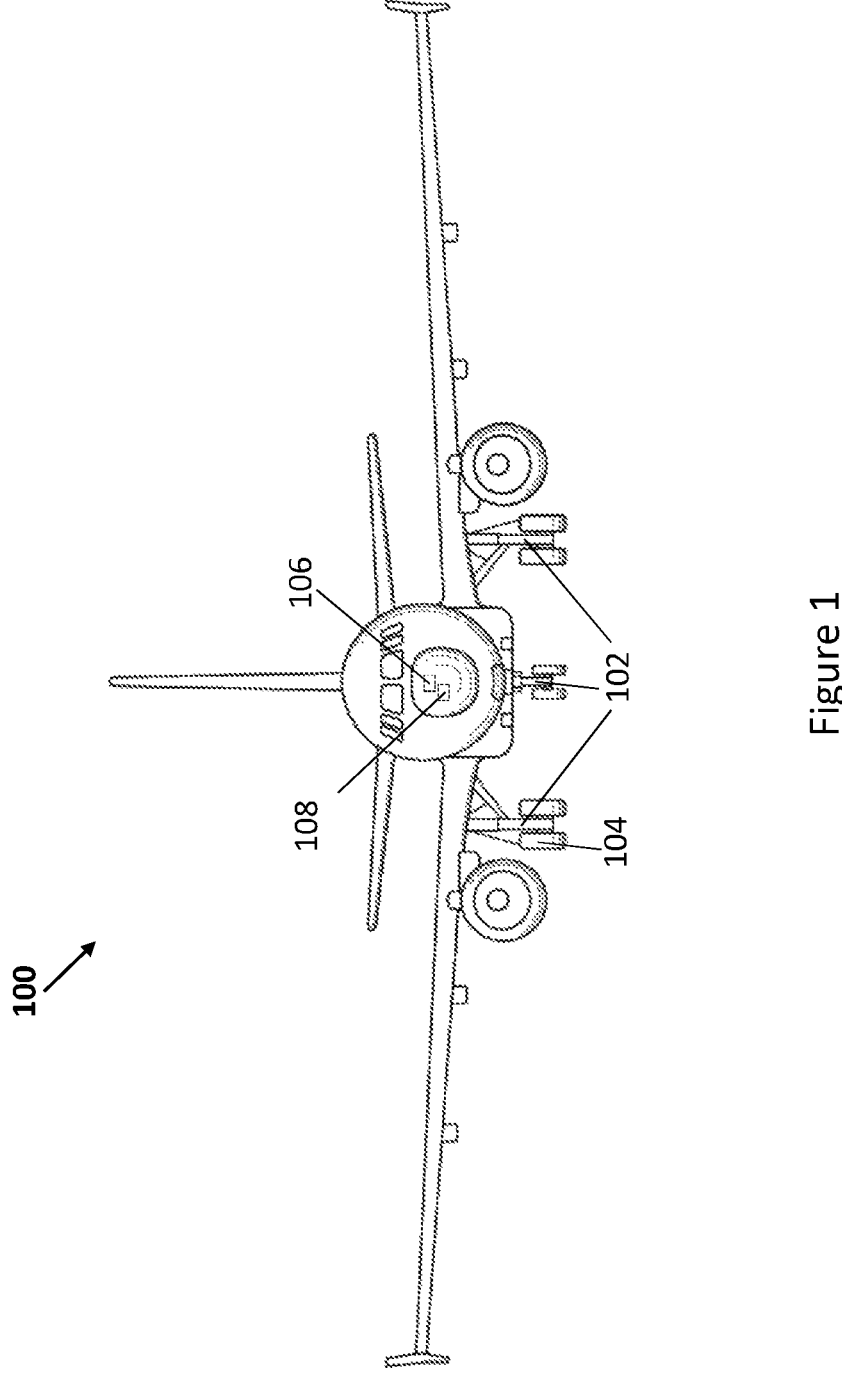
FIG. 1 is a simplified schematic view of an aircraft on which examples may be deployed.

FIG. 1 is a simplified schematic view of an aircraft 100. The aircraft 100 comprises a plurality of landing gear assemblies 102. The landing gear assemblies may include main and nose landing gears that are deployed or extended during take-off and landing. Each landing gear assembly 102 includes wheels 104. The aircraft 100 comprises a computing system 106, which, for example, comprises one or more processors and one or more computer readable storage media. The aircraft 100 may also comprise instruments 108, such as instruments or sensors for measuring characteristics or parameters related to the aircraft, and instruments or sensors for measuring environmental characteristics.

Figure 2:
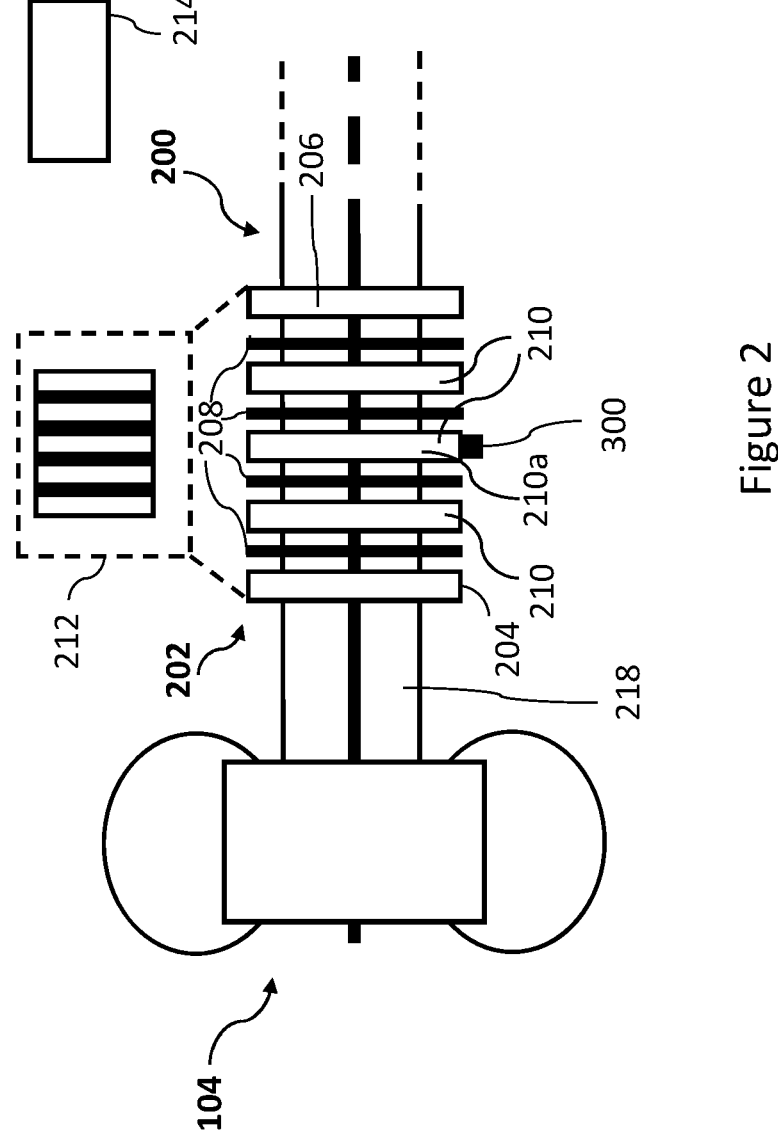
FIG. 2 is a simplified schematic view of a brake and a wheel of an aircraft landing gear assembly according to an example.

FIG. 2 is a simplified schematic view of an aircraft wheel brake 200 associated with the wheel 104 of the aircraft 100. The wheel brake 200 applies a braking force to inhibit the rotation of the wheel 104 when applied. Each of the wheels of the aircraft 100 may have a wheel brake 200 associated with it. In this example, the wheel brake 200 comprises a plurality of brake discs 202 including a pressure plate 204, a reaction plate 206, and a number of rotors 208 and stators 210. In this example, the brake discs 202 include a plurality of rotors and stators, and the wheel brake 200 is therefore a multiple disc brake. In other examples, the wheel brake 200 may not be a multiple-disc brake: there may be only one disc 208, for example, between a pressure plate 204 and a reaction plate 206. In some examples, the brake discs 202 may include up to 9 discs or 11 discs, or any other number which is suitable for a wheel brake of an aircraft. The brake discs 202 may collectively be referred to as a heat pack. The components of the wheel brake 200 (hereafter, for brevity, the wheel brake 200 is referred to simply as the brake 200) such as the brake discs 202 may be housed in a wheel brake housing (not shown). As referred to herein, the term brake is used as if to include such a wheel brake housing.

It will be understood that the type of wheel brake used in an aircraft landing gear depends on the characteristics of the aircraft in question, such as size, carrying capacity and the like. The following may be applied to any wheel brakes suitable for use as aircraft wheel brakes which heat up when applied to reduce aircraft speed, as discussed in the following.

When the aircraft 100 travels along the ground supported by the landing gear assembly 102, the rotors rotate with the wheel 104 (the rotors are keyed to the wheel 104), whereas the stators, the pressure plate 204 and the reaction plate 206 do not rotate with the wheel 104 (the stators, the pressure plate 204 and the reaction plate 206 are keyed to a torque tube 218 associated with the wheel 104 which does not rotate with the wheel 104). When braking is applied, the pressure plate 204 is urged towards the reaction plate 206 so that the brake discs 202 come into contact with one another (as shown in box 212 of FIG. 2) and friction acts to inhibit the rotational motion of the rotors, thus generating a braking force. When the brake 200 is applied, some of the kinetic energy of the aircraft 100 is absorbed into the brake discs 202 as heat (by the action of friction). Accordingly, the brake 200 heats up when it is applied to cause the aircraft 100 to slow down.

Any one or more of the rotors, stators, pressure plate 204 and the reaction plate 206 may be composed of Carbon-Carbon (CC) composites. A brake including brake discs composed of CC composites may be referred to as a carbon brake. For example, the brake discs 202 may be composed of a graphite matrix reinforced by carbon fibers.

Those skilled in the art will appreciate that the environment of the brake discs 202 may be harsh due to vibration and/or physical shock during application of braking for example. The environment of the brake discs 202 may be harsh due to high temperatures reached by the brake discs 202, for example.

In this example, the aircraft 100 comprises a braking system 214 which controls the operation of the brake 200.

The braking system 214 causes the brake 200 to be applied in response to a braking request (for example when a pilot of the aircraft 100 presses a brake pedal). For example, the brake 200 may be hydraulically actuated in which case the braking system 214 includes a hydraulic system (not shown) operationally connected with the brake 200. In other examples, the brake 200 may be electrically actuated in which case the braking system 214 includes an electronic brake actuation system. The braking system 214 may be controlled by the computing system 106.

Figure 3:
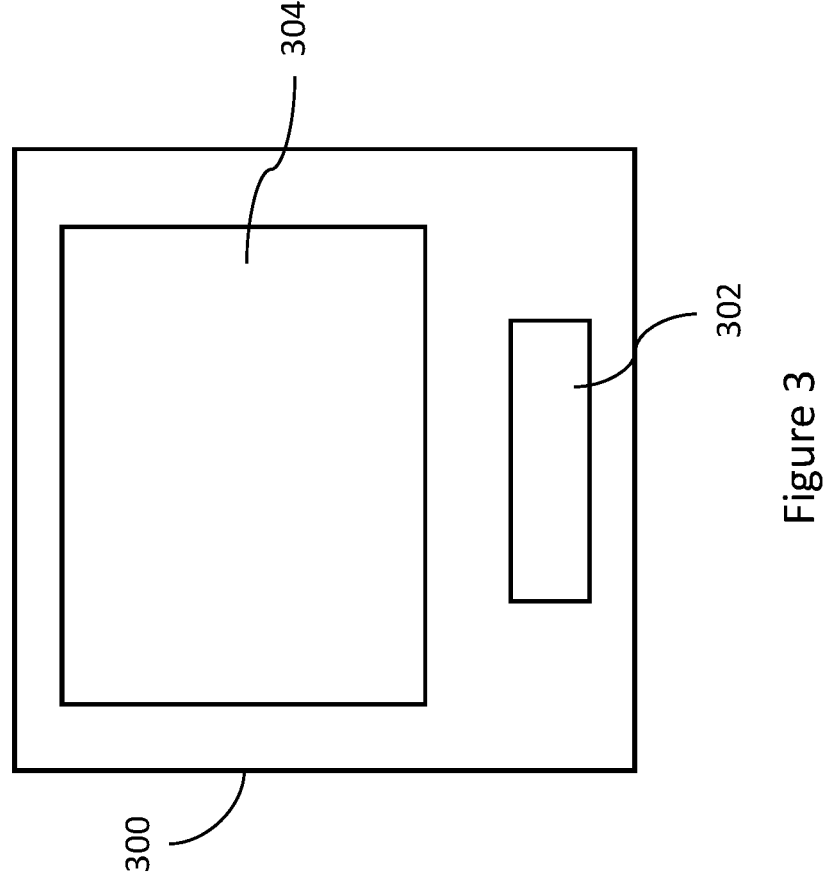
FIG. 3 is a simplified schematic block diagram of a temperature sensing device according to a first example.

FIG. 3 is a simplified schematic view of a temperature sensing device 300. The temperature sensing device 300 is to sense aircraft wheel brake temperature (for example, the temperature of the brake 200). For example, the temperature sensing device 300 may be attached to a component of the brake in order to sense the temperature of that component of the brake 200. For example, the temperature sensing device 300 may be attached to one of the brake discs 202. In the example of FIG. 2, the temperature sensing device 300 is attached to one of the stators. For example, the temperature sensing device 300 is attached to a first stator 210a, as schematically shown.

The temperature sensing device 300 may be attached to the first stator 210a in a manner that can withstand the high temperatures expected to occur at the first stator 210a. For example, the temperature sensing device 300 may be attached to the first stator 210a by means of a ceramic adhesive. Ceramic adhesive may be intended to withstand high temperatures, for example in excess of 1000° C. For example, the ceramic adhesive may be applied between the first stator 210a and the temperature sensing device 300 and cured such that the temperature sensing device 300 is bonded to the first stator 210a using cured ceramic adhesive material (for example, ceramic epoxy adhesive material). In some examples, the first stator 210a comprises a first formation (for example, one or more grooves). The first formation may be formed by cutting, grinding, drilling, or boring the first formation into the material of the first stator 210a. In such examples, a second formation may be formed from the ceramic adhesive to interlock with the first formation. For example, the ceramic adhesive with the second formation may be an attachment element for attaching the temperature sensing device 300 to the first stator 210a. For example, the second formation is complementary to the first formation. For example, the first formation is a groove formed in the first stator 210a and the second formation is a spike which fits into the groove to inhibit movement between the first stator 210a the attachment element along an axial direction and a circumferential direction of the first stator 210a. In some examples, providing the attachment element as described comprises applying uncured ceramic adhesive material to the surface of the first formation to create the second formation.

It will be appreciated that the temperature sensing device 300 may be attached to a brake disc in a number of ways. Alternatively, or in addition to the use of ceramic adhesive, other fasteners such as ceramic bolts may be used to attach the temperature sensing device 300. For example, a ceramic bolt may be passed through a through hole in the temperature sensing device 300 and engage with a threaded hole in the first stator 210a. In some examples, an appropriately shaped clip (for example, a metal clip) may be used as an attachment element. For example, the clip may comprise through holes and may be attached to the first stator 210a using bolts. Those skilled in the art will appreciate the various ways of attaching components to withstand high temperatures.

The temperature sensing device 300 comprises a surface acoustic wave (SAW) sensor element 302. In the example of FIG. 3, the temperature sensing device also comprises a sensor antenna 304, which is electrically coupled to the SAW sensor element 302. The temperature sensing device 300 may be a passive device in that it does not require electrical power to operate. It will be understood that the SAW sensor element 302 works based on SAWs generated in the SAW sensor element 302. For example, the SAW sensor element 302 comprises a transducer which converts an input signal (for example, an electrical signal) into a surface acoustic wave that resonates in the SAW sensor element 302. The SAW sensor element 302 also, for example, comprises a transducer to convert the SAW into an output signal (for example, an output signal).

The temperature sensing device 300 may be configured to withstand the harsh environment of the brake discs 202. For example, the temperature sensing device may be configured to withstand at least one of: a saw tooth shock profile of 6 g at 20 ms duration, a saw tooth shock profile of 55 g at 30 ms duration, a saw tooth shock profile of 70 g at 0.4 ms duration, a half-sine shock profile of 40 g at 30 ms duration, a half-sine shock profile of 50 g at 0.5 ms duration, and vibration of 50 g at 2 kHz for a minimum duration of 3 hours. Vibrations and/or shock testing may be performed in accordance with Radio Technical Commission for Aeronautics (RTCA) DO-160G.

It will be understood that the SAW sensor element 302 works based on SAWs generated in the SAW sensor element 302. For example, the SAW sensor element 302 comprises a transducer which converts an input signal (for example, an electrical signal) into a surface acoustic wave that resonates in the SAW sensor element 302. The SAW sensor element 302 also, for example, comprises a transducer to convert the SAW into an output signal (for example, an output signal). Physical properties (such as temperature, for example) of the SAW sensor element may be determined based on the output signal.

The input signal may be referred to as an interrogation signal. That is because the interrogation signal causes the output signal based on which, for example, temperature can be determined. The interrogation signal therefore acts to query the SAW sensor element 302 to provide an output signal. The interrogation signal may be wirelessly received by the temperature sensing device 300. The output signal may be wirelessly transmitted by the temperature sensing device 300.

The SAW sensor element 302 comprises one or more interdigital transducers (IDTs). The IDTs are for converting between a SAW and, for example, an electrical signal. The functioning of an IDT is described further below. In some examples, the SAW sensor element 302 is a one-port SAW sensor. In such examples, the SAW sensor element 302 has one IDT. For example, the SAW sensor element 302 may have one IDT and reflectors either side of the IDT to reflect the SAW. In such examples, the one IDT converts an input signal into a SAW and also converts the SAW back into an electrical signal as a response (output) signal.

In some examples, the SAW sensor element 302 is a two-port SAW sensor. In such examples, the SAW sensor element 302 comprises two IDTs spaced apart from one another. There is an input IDT which converts an input signal into a SAW. The SAW travels from the input IDT to an output IDT. The output IDT converts the SAW into an output signal. Those skilled in the art will appreciate the various configurations of a SAW sensor element.

Figure 4:
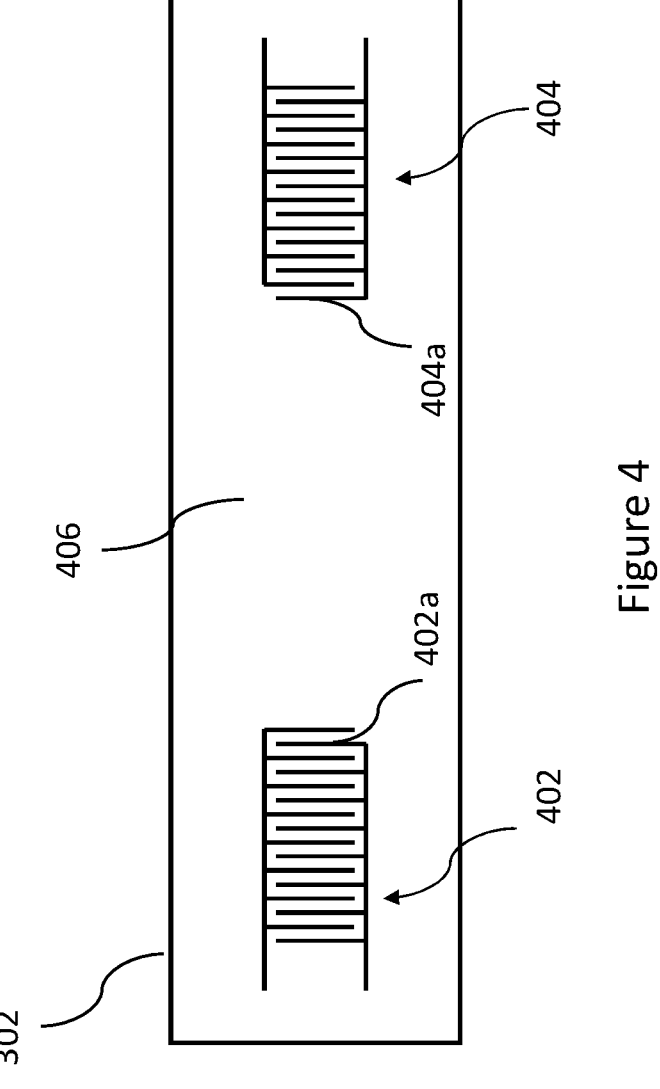
FIG. 4 is a simplified schematic plan view of a surface acoustic wave sensor element, according to an example.

FIG. 4 illustrates a particular example of the SAW sensor element 302. In this example, the SAW sensor element 302 is a two-port SAW sensor, and comprises an input IDT 402 and an output IDT 404. Each of the input IDT 420 and the output IDT 404 comprises two interlocking comb-shaped arrays of electrodes, deposited on the surface of a piezo-electric substrate 406 to form a periodic structure. The electrodes may be metallic electrodes, for example. In this example, the input IDT 402 comprises a first periodic electrode structure 402a and the output IDT 404 comprises a second periodic electrode structure 404a. The input IDT 402 is provided at a first location of the piezoelectric substrate 406 and the output IDT 404 is provided at a second location of the piezoelectric substrate 406 such that there is a space between the input IDT 402 and the output IDT 404.

Those skilled in the art will appreciate that a piezoelectric material can generate an electric charge in response to mechanical stress. Furthermore, a piezoelectric material can deform and generate mechanical stress in response to an applied electric field. An alternating electrical signal can be applied to the input IDT 402 such that adjacent electrodes have opposite polarities and the polarity of each electrode alternates according to the applied alternating electrical signal. Such a signal causes there to be a region of compressive stress next to a region of tensile stress, and each region alternates between compressive and tensile stress. As a result of this alternating compressive and tensile stress, there is generated a mechanical wave. This mechanical wave is what is referred to as a surface acoustic wave (SAW), as described above. SAWs in the SAW sensor element 302 are generated at the resonant frequency of the SAW sensor element 302.

In the example of FIG. 4, the SAW travels from the input IDT 402 to the output IDT 404. The alternating regions of compressive and tensile stress caused by the SAW at the output IDT cause there to be alternating electric fields. These alternating electric fields generate an electrical signal in the output IDT such that the polarities of adjacent electrodes of the output IDT 404 alternate in the manner described above for the input IDT 402. In other words, an electrical signal is generated at the output IDT 404 by the reverse of the process which took place at the input IDT 402 to generate the SAW from the input electrical signal.

As previously described, the physical properties (such as temperature, for example) of the SAW sensor element may be determined based on the output signal. The characteristics of the SAW in the SAW sensor element 302 depend on the physical properties of the SAW sensor element such as temperature. Therefore, by detecting the characteristics of the SAW, the temperature of the SAW sensor element 302 can be determined. For example, the characteristics of the SAW are detected using the output signal generated by the output IDT 404 in response to an interrogation signal received at the input IDT 402.

Various characteristics of the SAW may be detected. For example, a delay relating to the transmission of the interrogation signal and receipt of the output signal in response from the temperature sensing device 300, a phase shift response of the SAW sensor element 302, and/or a resonant frequency of the SAW sensor element 302 may be detected. For example, the frequency of the output signal corresponds to the frequency of the SAW and therefore the resonant frequency of the SAW sensor element 302. A desired physical property of the SAW sensor element 302 (such as temperature) may then be determined from the detected characteristic of the SAW sensor element 302.

A predefined relationship between the detected characteristic (for example, the resonant frequency) of the SAW sensor element 302 and the temperature of the SAW sensor element 302 may be stored in a computer readable memory (for example, in the computing system 106) on the aircraft 100, for example. The predefined relationship specifies what the detected characteristic of the SAW sensor element 302 is expected to be at various different temperatures (for example, obtained from calibration and/or testing of the SAW sensor element 302). For example, from a given resonant frequency, the temperature of the SAW sensor element 302 is determined from the predefined relationship. The predefined relationship may be stored in the form of a look-up table, rule, correlation equation, graph, etc.

The predefined relationship may be determined by performing calibration or other test on the SAW sensor element 302. For example, test may be performed to cause the SAW sensor element 302 to resonate at different temperatures and determine the resonant frequencies at those temperature in order to establish the predefined relationship.

As previously described, the temperature sensing device 300 is attached to one of the brake discs 202. In the example of FIG. 2, the temperature sensing device is attached to one of the stators 210. Therefore, the temperature of the SAW sensor element 302 corresponds to the temperature of the brake disc to which it is attached.

The interrogation signal may be wirelessly received by the temperature sensing device 300. The temperature sensing device 300 may comprise (as in the example of FIG. 3) a sensor antenna 304 configured to wirelessly receive the interrogation signal, and supply the interrogation signal to the SAW sensor element 302. For example, the sensor antenna 304 receives the interrogation signal in the form of radio waves and converts the radio waves into an electrical signal. The SAW sensor element may be configured to, responsive to the interrogation signal, output a signal as a response (the described output signal), the output signal indicative of the resonant frequency of the SAW sensor element 302, to the sensor antenna 304. For example, the sensor antenna 304 may be configured to wirelessly transmit the output signal. For example, the sensor antenna 304 converts the electrical output signal into radio waves.

For example, the sensor antenna 304 supplies the interrogation signal to the input IDT 402 of the SAW sensor element 302. The interrogation signal as received at the input IDT 402 is an alternating electrical signal which causes the input IDT 402 to generate a SAW as previously described. The SAW sensor element 302 provides an output signal (generated by the output IDT 404 as previously described). For example, the output signal is supplied from the output IDT 404 to the sensor antenna 304. The sensor antenna 304 transmits the output signal. For example, the sensor antenna 304 is electrically coupled to the input IDT 402 and the output IDT 404. The origin of the interrogation signal and the components which receive and process the output signal are described later.

A change in temperature of the SAW sensor element 302 causes a change in the resonant frequency. For example, as the temperature of the SAW sensor element 302 increases, the resonant frequency of the SAW sensor element decreases. The frequency of the SAW depends on the spacing between the electrodes of the IDTs. The spacing between adjacent electrodes is referred to as the pitch of the IDT in question. The pitch determines the wavelength of the SAW generated by the IDT. The pitch is equal to half of the wavelength of the SAW generated by the IDT. Therefore, the desired frequency resonant frequency of the SAW sensor element The frequency of the SAW depends on the propagation velocity of the SAW and the wavelength of the SAW according to Equation (1) below.

$$f = \frac{V_s}{\lambda} \tag{1}$$

In Equation (1), f represents the frequency of the SAW, $V_s$ represents the propagation velocity of the SAW in the SAW sensor element in question, and $\lambda$ represents the wavelength of the SAW.

The frequency of the SAWs generated in the SAW sensor element 302 can be referred to as the resonant frequency of the SAW sensor element. It will be appreciated that, for a given propagation velocity of the SAW in the SAW sensor element 302, the resonant frequency of the SAW sensor element 302 can be configured by selecting an appropriate pitch for the IDTs of the SAW sensor element 302.

The temperature of the SAW sensor element 302 may be determined by detecting the resonant frequency of the SAW sensor element 302 as indicated by the output signal.

Figure 5:
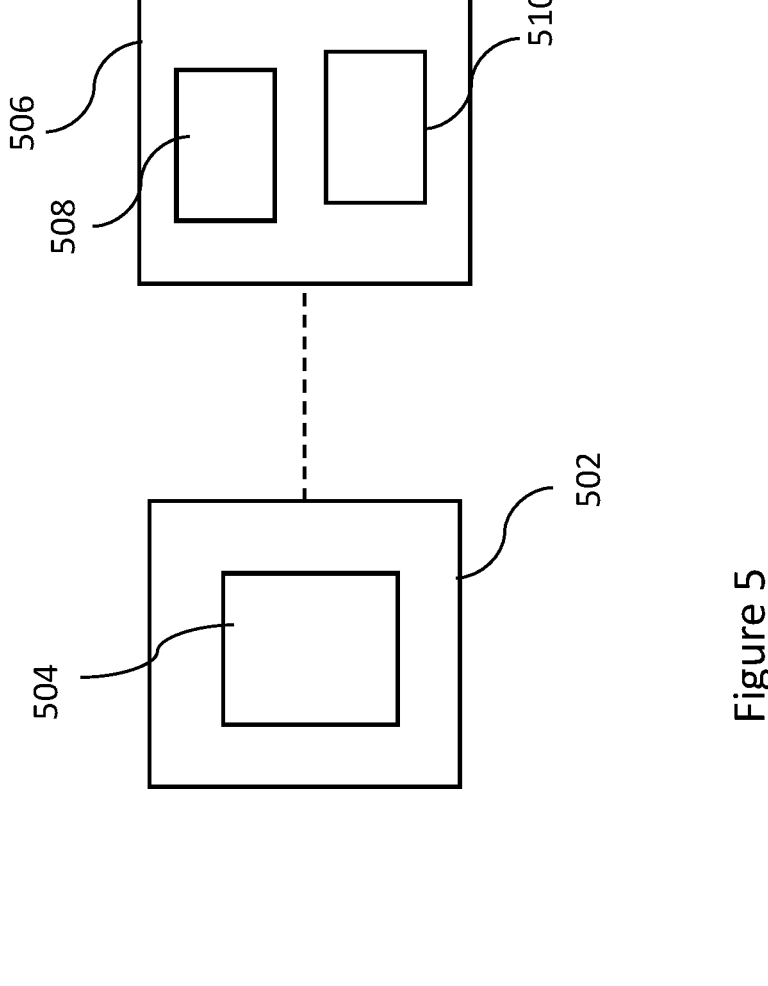
FIG. 5 is a simplified schematic block diagram of a temperature sensing system according to an example.
Figure 5:
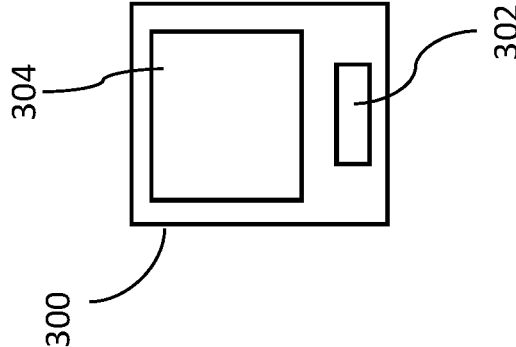
Figure 5:
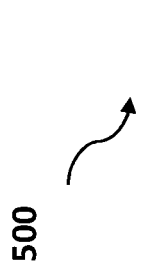

FIG. 5 schematically illustrates an example of a temperature sensing system 500 for sensing aircraft wheel brake temperature. The temperature sensing system 500 comprises the temperature sensing device 300 according to any of the described examples. The temperature sensing system 500 also comprises a wireless relay device 502 to deliver the interrogation signal for wirelessly interrogating the SAW sensor element 302. The wireless relay device 502 delivers the interrogation signal by wirelessly transmitting the interrogation signal to the temperature sensing device 300. The wireless relay device 502 also wirelessly receives the described output signal. The wireless relay device 502 is hereafter simply referred to as the relay 502.

In some examples, the relay 502 comprises a relay antenna 504. The relay antenna wirelessly transmits the interrogation signal and wirelessly receives the output signal. In some such examples, the relay 502 is simply a device for communicating wirelessly with the temperature sensing device 300. As described, the temperature sensing device 300 may be attached to one of the brake discs 202. The relay 502 may be attached to a component of the brake 200 or wheel 104 such that it can wirelessly communicate with the temperature sensing device 300 attached to a brake disc. For example, the relay 502 may be mounted so as to maintain line of sight with the temperature sensing device 300.

The wireless communication between the temperature sensing device 300 and the relay 502 can be implemented, for example, by electromagnetic, inductive or capacitive coupling of the relay 502 to the temperature sensing device 300. For example, each of the sensor antenna 304 and the relay antenna 504 may be configured to convert electrical signals to radio waves and vice versa, with the radio waves being transmitted between the respective antennas.

In some examples, the temperature sensing device 300 is attached to the first stator 210a and the relay 502 is attached to the torque tube 218 to which the first stator 210a is keyed. In such examples, the relay 502 is attached to the torque tube at a position so as to be in the line of sight of the temperature sensing device 300 on the first stator 210a. In other examples, the temperature sensing device 300 may be attached to a different brake disc or a different component of the brake 200, and the relay 502 may be attached to an appropriate location to maintain line of sight with the temperature sensing device 300.

The temperature sensing system 500 may comprise an interrogation apparatus 506. The interrogation apparatus 506 may form part of the computing system 106 of the aircraft 100. In such examples, the interrogation apparatus 506 forms a communication link (which may be wireless or wired) with the relay 502. The interrogation apparatus 506 comprises a controller 508 configured to provide the interrogation signal. For example, the controller 508 may provide the interrogation signal based on a command signal received from another component of the computing system 106. The command signal may comprise the interrogation signal, and the interrogation signal may simply be retransmitted towards to the relay 502. In other examples, the command signal may be an instruction for the controller 508 to generate the interrogation signal.

In the example of FIG. 5, the interrogation apparatus 506 comprises a transceiver 510 for transmitting the interrogation signal to the relay 502 and receiving the described output signal from the relay 502. The transceiver 510 may communicate with the relay 502 via a wired communication link or wirelessly. For example, for wireless communication, respective antennas may be provided as part of the relay 502 and the interrogation apparatus 506.

The SAW sensor element 302 has a resonant frequency within a frequency range between 175 megahertz (MHz) and 190 MHz at a predetermined temperature. A frequency range between 175 MHz and 190 MHz is not limited to a range having 175 MHz as a lower limit and 190 MHz as an upper limit. For example, the frequency range may be any range that falls between 175 MHz and 190 MHz (for example, 175 MHz to 180 MHz, 176 MHz to 188 MHz, 180 MHz to 190 MHz, etc.). In some examples, the resonant frequency of the SAW sensor element 302 is within the frequency range when the temperature of the SAW sensor element 302 is within a predetermined temperature range (for example, 24° C. to 1000° C.).

Figure 6:
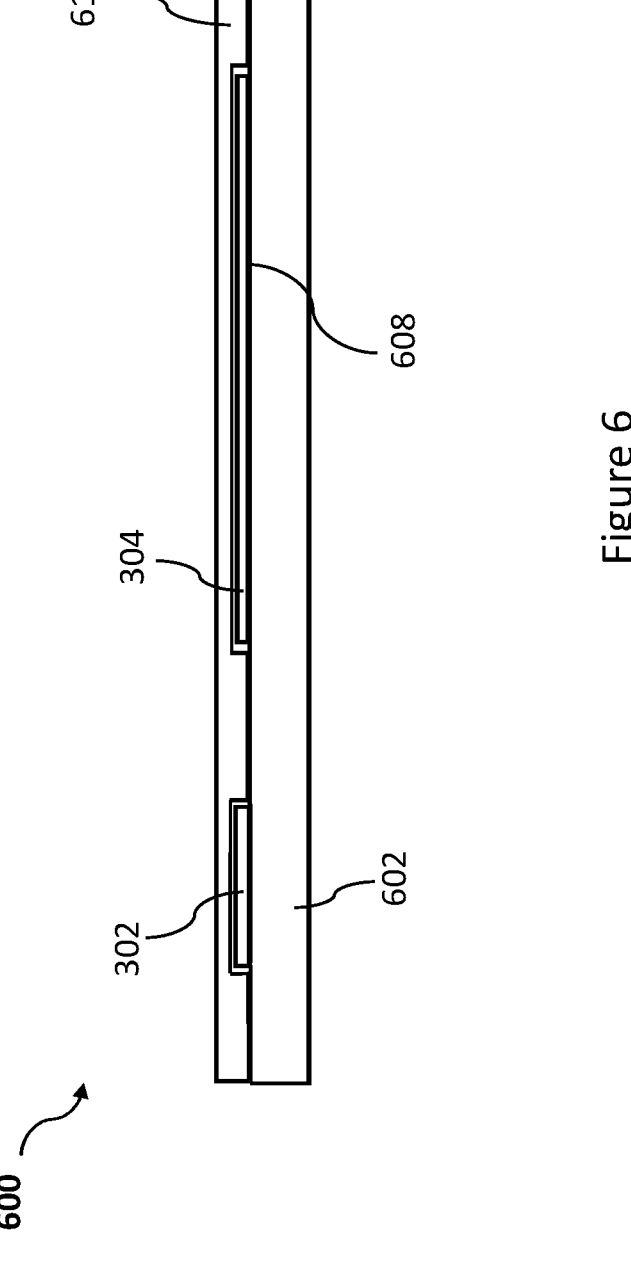
FIG. 6 is a simplified schematic side-cross sectional view of a temperature sensing device according to a first example.

FIG. 6 is a simplified schematic side cross-sectional view of a first temperature sensing device 600, according to an example. The first temperature sensing device 600 is a more specific example of the described temperature sensing device 300. The first temperature sensing device 600 comprises a sensing device substrate 602, and one or more package layers attached to the sensing device substrate 602. The sensing device substrate carries one or more electronic components for sensing temperature. In some examples, the electronic components comprise the described SAW sensor element 302 mounted to the sensing device substrate 602. The electronic components may also comprise the sensor antenna 304, electrically coupled to the SAW sensor element, provided on the sensing device substrate 602.

In the example of FIG. 6, the SAW sensor element 302 is mounted to the sensing device substrate 602. In some examples, the SAW sensor element 302 may be adhered to a surface of the sensing device substrate 602. In some examples, the sensing device substrate 602 comprises a slot into which the SAW sensor element 302 can be mounted. Those skilled in the art will appreciate the various way of mounting an electrical component such as the SAW sensor element 302 to the sensing device substrate 602.

In the example of FIG. 6, the sensor antenna 304 is provided on the first surface 608 of the sensing device substrate 602. In some examples, the one or more package layers comprise a first package layer 610. In the example of FIG. 6, the first temperature sensing device 600 comprises the first package layer 610. In other examples, there may be provided further package layers. Such examples are described later.

The first package layer 610 is overlaid on the first surface 608 of the sensing device substrate 602 to cover the sensor antenna 304 and the SAW sensor element 302. Advantageously, the first package layer 610 covering the electronic components serves to protect those electronic components. For example, the first package layer 610 may protect the electronic components from damage from debris and the like. It will be appreciated that the first temperature sensing device 600 is for sensing aircraft wheel brake temperature and may be attached to the first stator 210a, as described. Therefore, the first temperature sensing device 600 may be in a harsh environment and providing protection for electronic components therein may be advantageous.

It will also be appreciated that the first temperature sensing device 600 is for use in high temperature environments. For example, the first stator 210a may reach temperatures in excess of 700° C. The first package layer 610 overlaid to cover the electronic components (i.e., the SAW sensor element 302 and the sensor antenna 304) advantageously provides the electronic component with protection from high temperatures. For example, the first package layer 610 may act as a temperature shield for the electronic components.

The sensing device substrate and/or the one or more package layers may comprise a ceramic material. In some examples, the sensing device substrate 602 comprises a ceramic material. For example, the sensing device substrate 602 is a layer of ceramic material. The ceramic material may be any ceramic material suitable to carry electronic components such as the SAW sensor element 302 and the sensor antenna 304, and suitable to withstand temperature extremes expected to occur at the brake discs 202 of the aircraft 100.

Alternatively, or in addition, the first package layer 610 may also comprise the same or different ceramic material to the sensing device substrate 602. Advantageously, a layer of a ceramic material may provide good thermal protection for the electronic components carried by the sensing device substrate 602. Therefore, the first package layer 610 comprising a ceramic material advantageously enhances the thermal protection provided to the electronic components carried by the sensing device substrate 602.

In some examples, the first package layer 610 comprises one or more slots (not shown) to accommodate the electronic components carried by the sensing device substrate 602. For example, the first package layer 610 may comprise one slot provided on the surface which contacts the first surface 608 of the sensing device substrate 602. The one slot may provide a space to accommodate the electronic components (such as the SAW sensor element 302 and the sensor antenna 304) so that the first package layer 610 does not physically contact the electronic components. In such examples, the first package layer 610 may contact the first surface 608 close to the outer edges of the first surface 608.

In the example of FIG. 6, the first package layer 610 comprises more than one slot. In the schematic shown in FIG. 6, the first package layer 610 comprises two slots. There is provided one slot to accommodate the SAW sensor element 302 and another slot to accommodate the sensor antenna 304. In some examples, the first package layer 610 does not comprise any slot as described. For example, the first package layer 610 without any slots may be attached to the sensing device substrate in a manner so that it does not physically contact the electronic components. For example, the first package layer 610 may be attached to the sensing device substrate 602 using a sealant or the like in a manner that does not adversely contact the electronic components.

In some examples, the sensing device substrate 602 and the one or more package layers are hermetically sealed together. Those skilled in the art will appreciate that such a hermetic seal may prevent passage of gasses or moisture into the space where the electronic components are. For example, the first package layer 610 may be hermetically sealed to the sensing device substrate 602. A hermetic seal may advantageously better protect the electronic components (for example, from extreme temperatures) by inhibiting contact with the outside environment.

Figure 7:
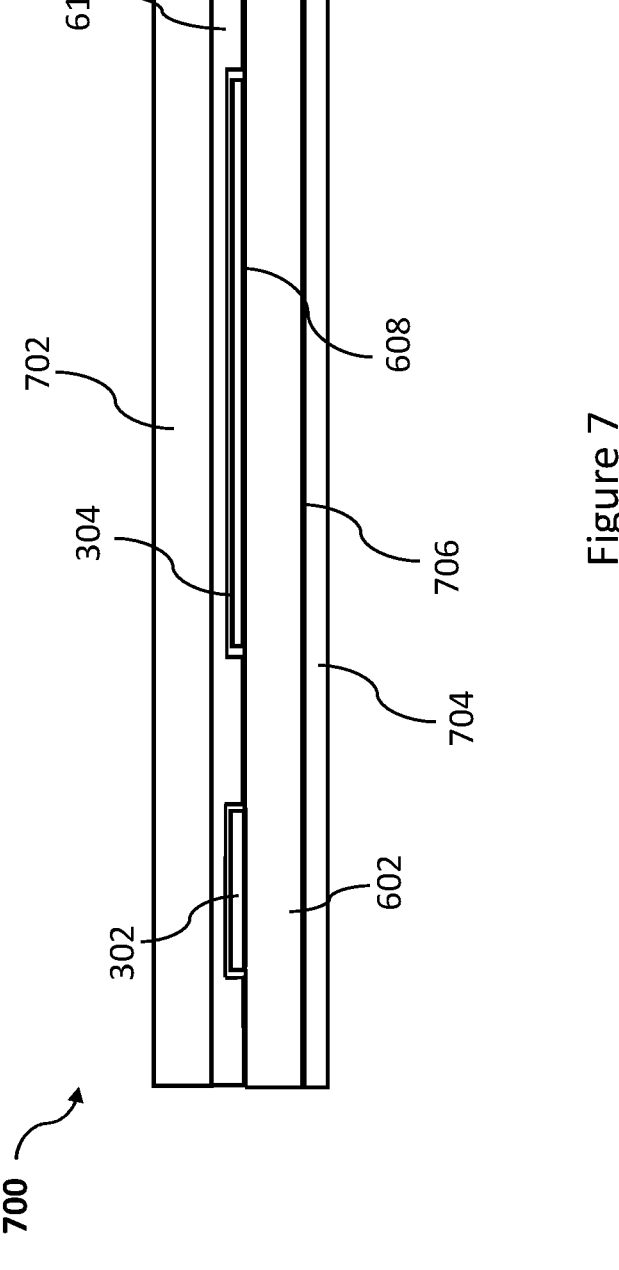
FIG. 7 is a simplified schematic side-cross sectional view of a temperature sensing device according to a second example.

In some examples, the one or more package layers also comprise a second package layer. FIG. 7 is a simplified schematic cross-sectional view of a second temperature sensing device 700, according to an example.

The second temperature sensing device 700 is similar to the first temperature sensing device 600. In addition to the previously described features, the second temperature sensing device 700 more than one package layer. The second temperature sensing device 700 comprises a second package layer 702 overlaid on the first package layer 610 such that the first package layer 610 is between the sensing device substrate 602 and the second package layer 702.

In some examples, the first package layer 610, the second package layer 702 and the sensing device substrate are hermetically sealed to one another. In some examples, the first package layer 610 is hermetically sealed to the sensing device substrate 602, but the second package layer 702 is not hermetically sealed. In some examples, there is no hermetic seal.

Providing the second package layer 702 may provide better thermal protection for the electronic components compared to omitting it, for example. Also, advantageously, providing the second package layer 702 may provide additional rigidity to the second temperature sensing device 700. The additional rigidity may enhance the physical robustness of the second temperature sensing device 700, for example, for reliable function in the harsh environment of the brake discs 202.

In some examples, the one or more package layers also comprise a third package layer. In the example of FIG. 7, a third package layer 704 is provided. The third package layer 704 is overlaid on a second surface 706 of the sensing device substrate 602. The second surface 706 is on the opposite side of the sensing device substrate 602 to the first surface 608.

The inclusion of the third package layer 704 may provide additional rigidity to the second temperature sensing device 700 such that it is physically robust, for example, for the harsh environment of the brake discs 202. The inclusion of the third package layer 704 may provide additional thermal protection for the electronic components carried by the sensing device substrate 602.

In some examples, the inclusion of the second and/or the third package layer may facilitate attachment of the second temperature sensing device 700 via the second and/or the third package layer in a manner that does not affect with the electronic components.

The one or more package layers may comprise Alumina. The one or more package layers may comprise a ceramic material which is suitable for high temperature applications, for example, suitable to withstand temperature up to 1000° C.

Figure 8:
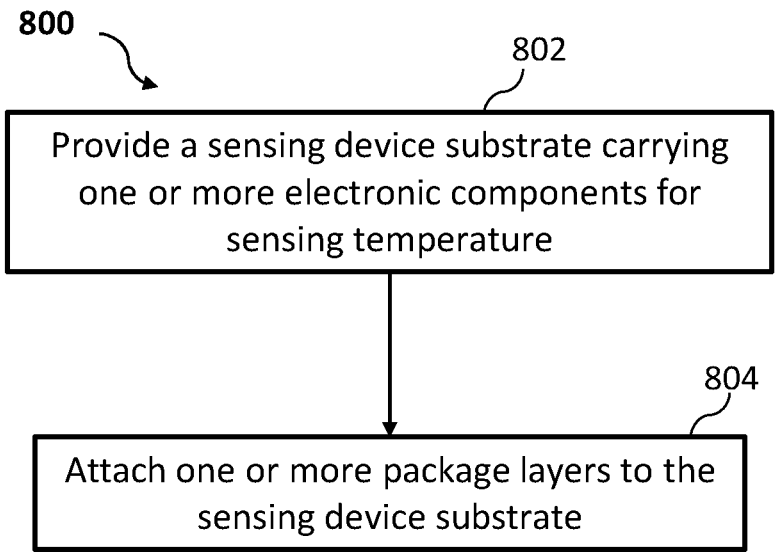
FIG. 8 is a flow diagram of a method of manufacturing a temperature sensing device, according to an example.

FIG. 8 is a flow diagram illustrating a method 800 of manufacturing a temperature sensing device to sense aircraft wheel brake temperature. At block 802 of the method 800, a sensing device substrate (such as the described sensing device substrate 602) carrying one or more electronic components for sensing temperature is provided. For example, providing the sensing device substrate 602 may comprise providing the SAW sensor element 302 mounted to the sensing device substrate 602, and providing the sensor antenna 304, electrically coupled to the SAW sensor element 302, on the sensing device substrate 602.

At block 804 of the method 800, one or more package layers are attached to the sensing device substrate 602. For example, block 804 may involve overlaying the first package layer 610 on the first surface 608 of the sensing device substrate 602 to cover the sensor antenna 304 and the SAW sensor element 302.

In some examples, block 804 may involve overlaying the second package layer 702 on the first package layer 610 such that the first package layer 610 is between the sensing device substrate 602 and the second package layer 702. In some examples, block 804 may involve overlaying the third package layer 704 on the second surface 706 of the sensing device substrate 602, wherein the second surface 706 is on the opposite side of the sensing device substrate 602 to the first surface 608. In some examples, block 804 involves hermetically sealing the sensing device substrate and one or more package layers together.

Attaching layers to one another may involve attachment using adhesive and the like. In the examples where hermetic seals are formed, an appropriate sealed may be used and cured to attach one layer to another. Those skilled in the art will appreciate the techniques for attaching one layer to another, where the layers comprise ceramic material, for example.

In some examples, a hermetic seal is formed between the sensing device substrate 602 and the first package layer 610 only. In other examples, the second and/or the third package layers may also form hermetic seals to the layer to which they attach.

In some examples, the relay 502 comprises the features relating to the one or more package layers according to any of the described examples in relation to the temperature sensing device. For example, the relay 502 comprises a relay substrate, and one or more package layers attached to the relay substrate. The one or more package layers may be ceramic layers, for example. The relay substrate carries one or more electronic components of the relay 502. For example, the one or more package layers of the relay 502 may comprise a ceramic material and provide thermal protection to the electronic components of the relay.

Certain components are described as being electrically coupled to other components. In some examples, components may be electrically coupled by virtue of an electrical connection. Those skilled in the art will appreciate that electronic components may also be capacitively or inductively coupled, for example. The type of electrical coupling depends on the characteristics of the electronic components and the particular application.

It should be noted that the Figures show simplified schematic views for the purpose of illustration. The Figures are intended to illustrate the described concepts and are not intended to convey dimensions, relative sizes of components and the like. In some cases, certain components are not shown for simplicity, as will be appreciated by those skilled in the art.

Although the invention has been described above with reference to one or more preferred examples, it will be appreciated that various changes or modifications may be made without departing from the scope of the invention as defined in the appended claims.

The invention claimed is:

1. A temperature sensing device to sense aircraft wheel brake temperature during operation of the aircraft wheel brake, the temperature sensing device comprising:

a sensing device substrate; and a first package layer and a second package layer attached to the sensing device substrate, wherein:

the sensing device substrate carries one or more of a surface acoustic wave, SAW, sensor element and a sensor antenna, electrically coupled to the SAW sensor element, for sensing temperature, wherein the first package layer is disposed on a first surface of the sensing device substrate enclosing the sensor antenna and the SAW sensor element, wherein the second package layer is disposed on the first package layer such that the first package layer is between the sensing device substrate and the second package layer, wherein the temperature sensing device is configured to withstand temperatures in excess of 1000° C., and wherein the second package layer provides additional rigidity and physical robustness for the temperature sensing device to reliably function in a harsh environment.

2. The temperature sensing device according to claim 1, wherein the one or more package layers comprise a third package layer overlaid on a second surface of the sensing device substrate, the second surface on the opposite side of the sensing device substrate to the first surface.

3. The temperature sensing device according to claim 1, wherein the first package layer comprises one or more slots to accommodate the electronic components carried by the sensing device substrate.

4. The temperature sensing device according to claim 1, wherein the sensing device substrate and the first and the second package layers are hermetically sealed together.

5. The temperature sensing device according to claim 1, wherein the sensing device substrate and/or the one or more package layers comprise a ceramic material.

6. A method of manufacturing a temperature sensing device to sense aircraft wheel brake temperature, the method comprising:

providing a sensing device substrate carrying a surface acoustic wave, SAW, sensor element and a sensor antenna, electrically coupled to the SAW sensor element, for sensing temperature;

attaching first and second package layers to the sensing device substrate;

wherein the first package layer is disposed on a first surface of the sensing device substrate enclosing the sensor antenna and the SAW sensor element, wherein the second package layer is disposed on the first package layer such that the first package layer is between the sensing device substrate and the second package layer, wherein the temperature sensing device is configured to withstand temperatures in excess of 1000° C., and wherein the second package layer provides additional rigidity and physical robustness for the temperature sensing device to reliably function in a harsh environment.

7. The method according to claim 6, wherein attaching one or more package layers comprises:

overlaying a first package layer on a first surface of the sensing device substrate to cover the sensor antenna and the SAW sensor element.

8. The method according to claim 6, wherein attaching one or more package layers comprises:

overlaying a second package layer on the first package layer such that the first package layer is between the sensing device substrate and the second package layer.

9. The method according to claim 8, wherein attaching one or more package layers comprises:

overlaying a third package layer on a second surface of the sensing device substrate, the second surface on the opposite side of the sensing device substrate to the first surface.

10. The method according to claim 6, wherein attaching one or package layers comprises:

hermetically sealing the sensing device substrate and one or more package layers together.

* * * * *